United States Patent
Maeda

(10) Patent No.: US 10,960,786 B2
(45) Date of Patent: Mar. 30, 2021

(54) SEAT MOVING STRUCTURE FOR UTILITY VEHICLE

(71) Applicant: KAWASAKI JUKOGYO KABUSHIKI KAISHA, Hyogo (JP)

(72) Inventor: Kazuhiro Maeda, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 16/279,448

(22) Filed: Feb. 19, 2019

(65) Prior Publication Data

US 2020/0262318 A1    Aug. 20, 2020

(51) Int. Cl.
*B60N 2/07* (2006.01)
*B60N 2/38* (2006.01)

(52) U.S. Cl.
CPC .............. *B60N 2/0722* (2013.01); *B60N 2/38* (2013.01)

(58) Field of Classification Search
CPC ....... B60N 2/0722; B60N 2/0715; B60N 2/07
See application file for complete search history.

(56) References Cited

U.S. PATENT DOCUMENTS

| | | | |
|---|---|---|---|
| 2,970,015 A * | 1/1961 | Ragsdale | B60N 2/0715 384/47 |
| 4,204,658 A * | 5/1980 | Courtois | B60N 2/0705 248/430 |
| 4,378,927 A * | 4/1983 | Graves | B60N 2/0715 248/561 |
| 4,588,234 A * | 5/1986 | Rees | B60N 2/0705 384/47 |
| 4,717,194 A * | 1/1988 | Ota | B60N 2/067 248/430 |
| 5,076,530 A * | 12/1991 | Dove | B60N 2/0705 248/420 |
| 5,192,045 A * | 3/1993 | Yamada | B60N 2/071 248/430 |
| 6,257,642 B1 * | 7/2001 | Schumann | B60N 2/015 248/429 |
| 6,520,474 B2 * | 2/2003 | Yoshida | B60N 2/071 248/424 |
| 10,144,310 B1 * | 12/2018 | Ferenc | B60N 2/067 |
| 2009/0102261 A1 * | 4/2009 | Bernhardt | B60N 2/0715 297/344.1 |
| 2011/0057085 A1 * | 3/2011 | Nonomiya | B60N 2/168 248/429 |

(Continued)

FOREIGN PATENT DOCUMENTS

| | | | | |
|---|---|---|---|---|
| DE | 102010042008 A1 * | 4/2012 | ........... | B60N 2/0732 |
| WO | WO-2010001956 A1 * | 1/2010 | ........... | B60N 2/0715 |

*Primary Examiner* — Timothy J Brindley
(74) *Attorney, Agent, or Firm* — Wenderoth, Lind & Ponack, L.L.P.

(57) ABSTRACT

A seat moving structure for a utility vehicle includes a seat and a seat rail for guiding movement of the seat in a longitudinal direction of the seat. The seat has a seat rail contact portion which is in contact with the seat rail. The seat rail has a rail support surface portion which supports the seat rail contact portion from below. The seat rail contact portion is made of a resin. The seat is movably supported in a line contact state or in a point contact state in the longitudinal direction of the seat on the rail support surface portion by the seat rail contact portion.

16 Claims, 11 Drawing Sheets

(56) References Cited

U.S. PATENT DOCUMENTS

| | | | |
|---|---|---|---|
| 2013/0020459 A1* | 1/2013 | Moriyama | B60N 2/01 248/636 |
| 2013/0193730 A1* | 8/2013 | Walter | B60N 2/12 297/341 |
| 2013/0206952 A1* | 8/2013 | Yamada | B60N 2/0722 248/429 |
| 2016/0176316 A1 | 6/2016 | Kosuge et al. | |
| 2017/0210249 A1* | 7/2017 | Ioppolo | B60N 2/07 |
| 2017/0267125 A1* | 9/2017 | Fujita | B60N 2/06 |
| 2018/0086232 A1* | 3/2018 | Kume | B60N 2/071 |
| 2019/0016236 A1* | 1/2019 | Couasnon | B60N 2/0732 |
| 2019/0023155 A1* | 1/2019 | Beier | B60N 2/0244 |
| 2019/0168639 A1* | 6/2019 | Sprenger | B60N 2/075 |
| 2020/0001745 A1* | 1/2020 | Shimizu | B60N 2/0818 |
| 2020/0086766 A1* | 3/2020 | Hagan | B60N 2/0705 |

* cited by examiner

SEAT MOVING STRUCTURE FOR UTILITY VEHICLE

BACKGROUND OF THE INVENTION

Field of the Invention

The present invention relates to a seat moving structure for a utility vehicle.

Description of the Related Art

US2016/0176316A1 discloses, as a seat moving structure for a utility vehicle, a structure where a seat attachment portion in which an elongated hole extending in a longitudinal direction is vertically formed in a penetrating manner is disposed at four corners of the seat, the seat is placed on a seat support portion of a vehicle body by way of the seat attachment portions, and seat guide portions formed on the seat support portions are made to pass through the elongated holes. With such a structure, the positions of the elongated holes are restricted in the longitudinal direction by the seat guide portions. Accordingly, the seat moving structure for a utility vehicle is configured such that the seat is slidable in the longitudinal direction.

SUMMARY OF THE INVENTION

With the structure disclosed in US2016/0176316A1, a seat slide amount which is a moving amount of the seat in the longitudinal direction depends on a length of the elongated hole in a long axis direction and hence, it is difficult to increase the seat slide amount. Further, a seat slide load required for sliding the seat is likely to be increased due to a frictional resistance generated between the seat attachment portions and the seat support portion.

The present invention has been made in view of the above-mentioned drawbacks, and it is an object of the present invention to provide a seat moving structure for a utility vehicle where a seat slide load can be reduced while increasing a seat slide amount.

To achieve the above-mentioned object, the seat moving structure for a utility vehicle according to the present invention includes:

a seat; and a seat rail for guiding moving of the seat in the longitudinal direction, in which the seat has a seat rail contact portion which is brought into contact with the seat rail, the seat rail has a rail support surface portion which supports the seat rail contact portion from below, the seat rail contact portion is made of a resin, and the seat is movably supported in a line contact state or in a point contact state in the longitudinal direction on the rail support surface portion by way of the seat rail contact portion.

According to the present invention, the seat rail contact portion is supported on the rail support surface portion in a line contact state or in a point contact state and hence, a contact area between the seat rail contact portion and the rail support surface portion can be reduced. Further, the seat rail contact portion is made of a resin and hence, the seat rail contact portion easily follows in conformity with the rail support surface portion so that friction resistance therebetween becomes low. Accordingly, a load necessary for moving the seat in the longitudinal direction can be reduced. Further, the seat moving structure is configured to move the seat rail contact portion on the rail support surface portion in the longitudinal direction and hence, a moving amount of the seat in the longitudinal direction can be easily increased. Accordingly, a load necessary for moving the seat in the longitudinal direction can be reduced while increasing a moving amount of the seat in the longitudinal direction.

The seat moving structure for the utility vehicle can preferably adopt the following configurations.

(1) An opening portion is formed in a bottom portion of the seat rail in a vertically penetrating manner.

With the configuration (1), even when a foreign substance exists on the seat rail, the foreign substance can be easily discharged from the seat rail through the opening portion. Accordingly, biting of the foreign substance between the seat rail contact portion and the rail support surface portion can be suppressed and hence, movability of the seat in the longitudinal direction can be easily and favorably maintained.

(2) In the seat moving structure for the utility vehicle having the configuration (1), the opening portion is formed at a position where the opening portion does not overlap with a moving trajectory of the seat rail contact portion which moves on the seat rail in the longitudinal direction.

With the configuration (2), the opening portion is not closed by the seat rail contact portion which moves on the seat rail and hence, properties of discharging a foreign substance can be easily maintained irrespective of the position of the seat rail contact portion.

(3) The seat rail contact portion is made of a wear resistant resin.

With the configuration (3), a friction coefficient between the seat rail contact portion and the rail support surface portion can be suppressed to a low level and hence, a load necessary for moving the seat in the longitudinal direction can be further reduced.

(4) There is no lubricant in a contact portion between the seat rail contact portion and the rail support surface portion.

With the configuration (4), there is no possibility that the seat rail contact portion made of a resin is exposed to a lubricant such as a lubrication oil or a grease. Accordingly, degradation of a resin due to the lubricant is prevented. Further, there is no lubricant in a sliding portion and hence, adhesion and biting of a foreign substance to the sliding portion can be prevented.

(5) The seat rail contact portion is formed into a curved surface shape protruding toward the rail support surface portion.

With the configuration (5), the seat rail contact portion is brought into line contact or point contact with the rail support surface portion and hence, a contact area between the seat rail contact portion and the rail support surface portion is further reduced so that friction resistance is reduced. With such a configuration, a load necessary for moving the seat in the longitudinal direction can be further reduced.

(6) In the seat moving structure for a utility vehicle having the configuration (5), in the seat rail, the rail support surface portion is disposed in a pair in the width direction, and each rail support surface portion extends downward in an inclined manner toward the center of the seat rail in the width direction.

With the configuration (6), the pair of rail support surface portions disposed in the width direction of the seat rail is formed into an approximately V shape as viewed in front view. Accordingly, the seat rail contact portion having a curved surface shape is guided to a center side of the seat rail in the width direction by the pair of rail support surface portions which is formed in an approximately V-shaped cross section and hence, the seat can be moved in a stable manner in the longitudinal direction.

(7) In the seat moving structure for a utility vehicle having the configuration (5), the seat rail contact portion is formed into a spherical shape.

With the configuration (7), the seat rail contact portion is brought into point contact with the rail support surface portion and hence, a contact area between the seat rail contact portion and the rail support surface portion is further reduced so that friction resistance between the seat rail contact portion and the rail support surface portion is reduced. Accordingly, a load necessary for moving the seat in the longitudinal direction is further reduced.

(8) In the seat moving structure for a utility vehicle having the configuration (5), the rail support surface portion has a curved surface shape, and the rail support surface portion has a curvature different from a curvature of the seat rail contact portion.

With the configuration (8), the seat rail contact portion can easily follows in conformity with the rail support surface portion while reducing the contact portion between the seat rail contact portion and the rail support surface portion and hence, the seat can be moved more smoothly.

(9) The seat rail contact portion includes a roller which rolls on the rail support surface portion.

With the configuration (9), the seat rail contact portion is brought into line contact with the rail support surface portion and hence, a contact area between the seat rail contact portion and the rail support surface portion is further reduced whereby friction resistance is reduced. Further, even when a foreign substance exists on the rail support surface portion, the seat rail contact portion can easily get over the foreign material by rolling the seat rail contact portion. With such a configuration, biting of a foreign substance between the seat rail contact portion and the rail support surface portion can be suppressed and hence, movability of the seat in the longitudinal direction can be easily further preferably maintained.

(10) In the seat moving structure for a utility vehicle having the configuration (9), a plurality of the rollers is provided in the longitudinal direction.

With the configuration (10), the seat can be moved in a stable manner while sharing a load by the plurality of rollers. Further, by sharing a load by the plurality of rollers, a load acting on one roller is reduced and hence, for example, a size of the roller in a width direction can be reduced so that the seat rail contact portion can be formed in a compact shape in the width direction.

(11) In the seat moving structure for a utility vehicle having the configuration (10), the plurality of rollers is supported in a rolling manner such that the rollers are disposed in a row in the longitudinal direction inside a bracket which is formed so as to have a U shape cross section which opens downward as viewed in front view.

With the configuration (11), the seat rail contact portion can be formed as a sub assembly formed by assembling the plurality of rollers to the bracket and, at the same time, the sub assembly can be assembled to the seat. With such a configuration, operability of assembling the seat rail contact portion having the plurality of rollers to the seat can be improved.

(12) In the seat moving structure for a utility vehicle having the configuration (11), portions of the bracket which face the rollers in the vertical direction are cut out.

With the configuration (12), it is possible to easily suppress interference between the rollers and a top wall of the bracket having the U-shaped cross section, and the seat rail contact portion assembled into the sub assembly can be formed in a compact shape in the vertical direction. With such a configuration, the moving structure of the seat can be formed in a compact shape in the vertical direction.

BRIEF DESCRIPTION OF THE DRAWINGS

The foregoing and the other features of the present invention will become apparent from the following description and drawings of an illustrative embodiment of the invention in which.

DETAILED DESCRIPTION OF THE INVENTION

A utility vehicle according to an embodiment of the present invention is described with reference to attached drawings. For the sake of convenience of the description, the description is made by assuming an advancing direction of the utility vehicle as "front side" of the utility vehicle and respective parts and right and left sides in a vehicle width direction as viewed from an occupant as "right and left sides" of the utility vehicle and the respective parts.

First Embodiment

Figure 1:
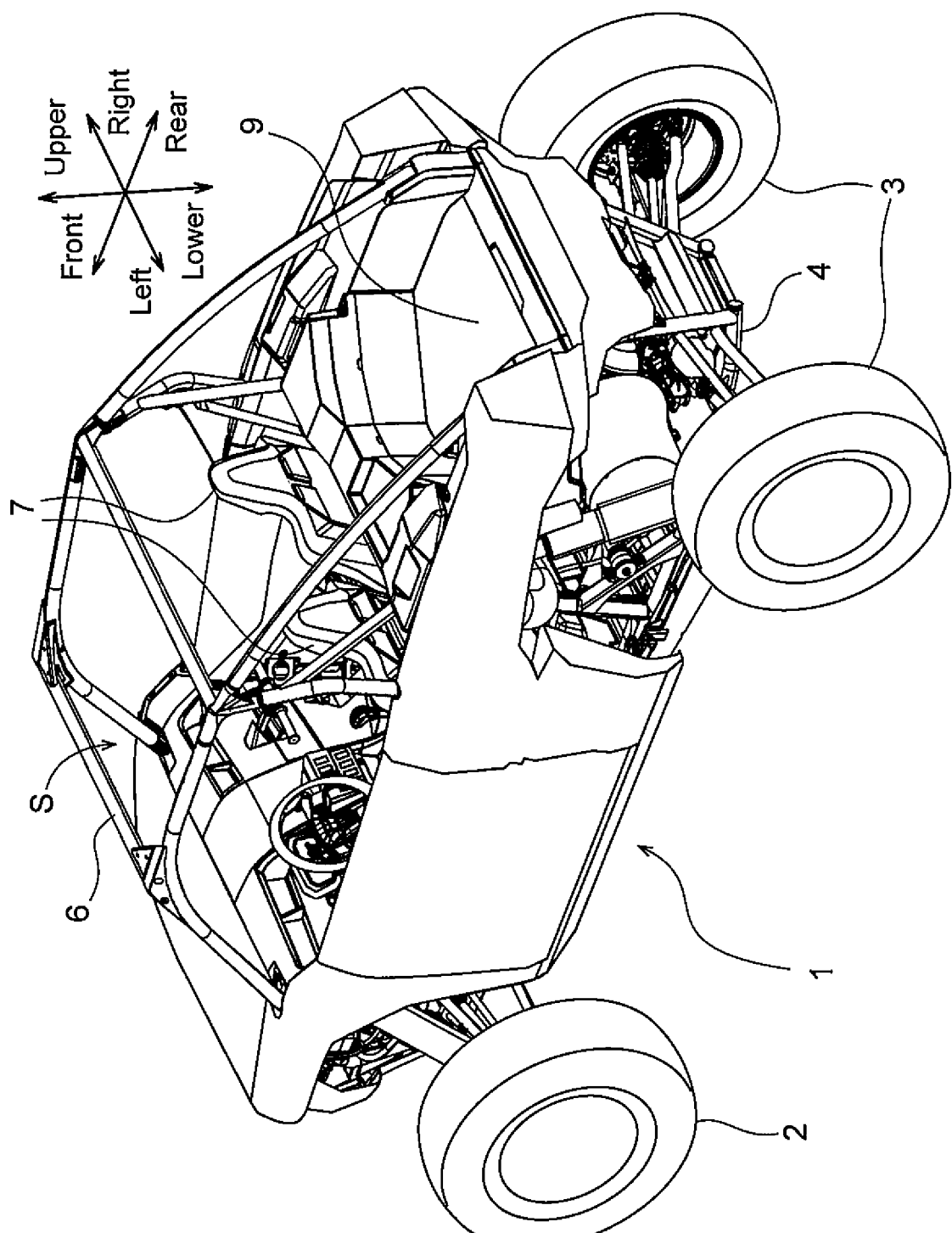
FIG. 1 is a perspective view of a utility vehicle, as viewed from a rear side, which includes a seat moving structure for a utility vehicle according to an embodiment of the present invention.

In FIG. 1, a utility vehicle 1 includes: a vehicle body frame 4; right and left front wheels 2 disposed on a front end of the vehicle body frame 4; and right and left rear wheels 3 disposed on a rear end of the vehicle body frame 4. A riding space S is positioned between the front wheels 2 and the rear wheels 3 in a longitudinal direction, and is surrounded by a ROPS 6. A pair of right and left independent type seats 7 is disposed in the inside of the riding space S. The utility vehicle 1 further includes a cargo bed 9 behind the riding space S, and an engine (not shown in the drawing) is disposed below the cargo bed 9. The ROPS is the abbreviation of rollover protective structure.

Figure 2:
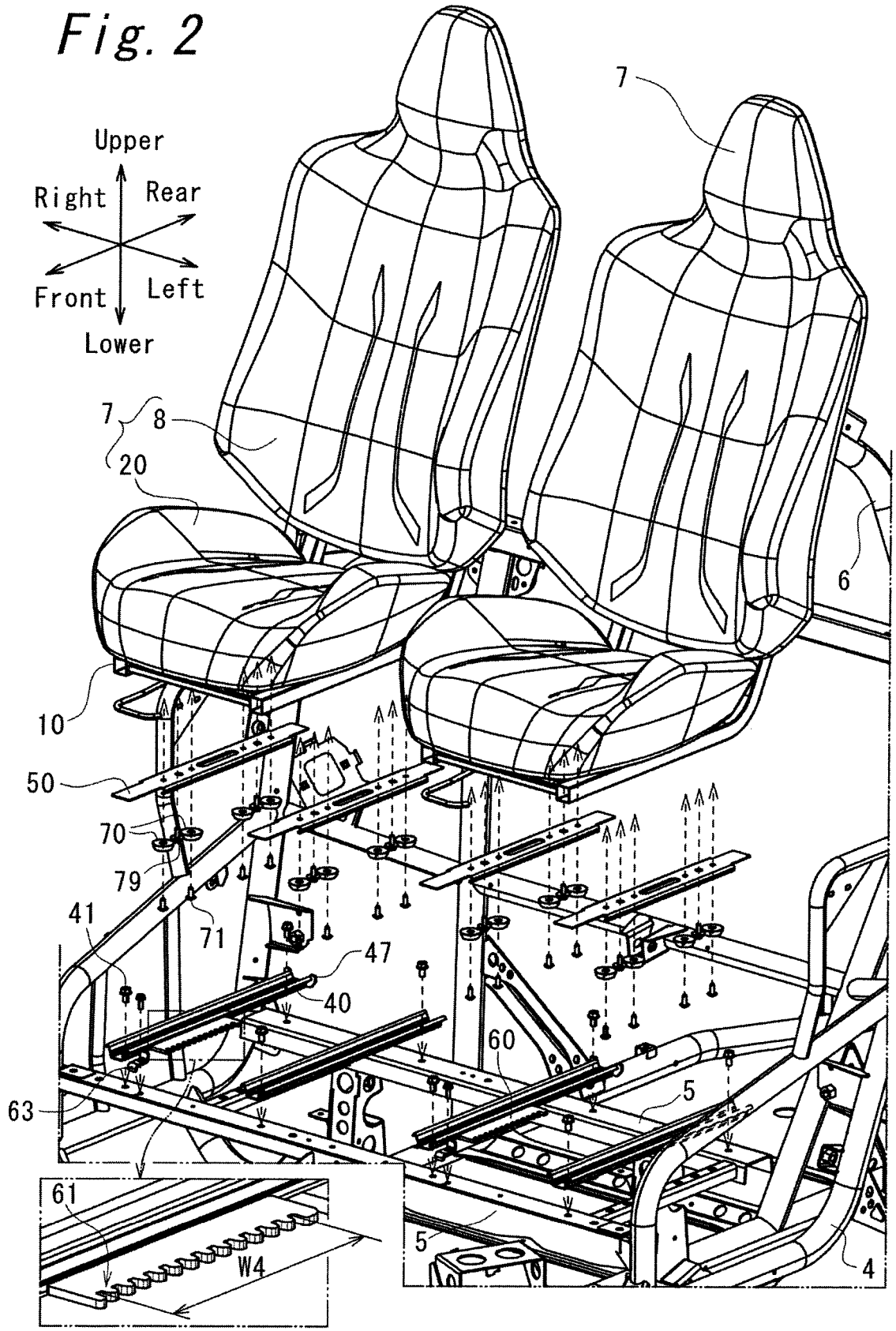
FIG. 2 is an exploded perspective view showing an attachment structure of seats.

FIG. 2 is an exploded perspective view showing the attachment structure for attaching the seats 7 on the vehicle body frame 4. As shown in FIG. 2, a pair of front and rear seat cross members 5 extending in a vehicle width direction is mounted on an upper portion of the vehicle body frame 4. A pair of right and left seat rails 40 extending in a longitudinal direction is fixed onto the seat cross members 5 by fastening bolts 41 corresponding to the pair of respective right and left seats 7.

The seat 7 has a seat back 8, a seat cushion 20, and seat frame 10 which supports the seat back 8 and the seat cushion 20 from below or behind. A pair of front and rear seat sliders 70 is attached to each four corner of a lower surface of the seat frame 10. The seat 7 is supported on the seat rails 40 by way of the seat sliders 70 in a slidable (movable) manner in a longitudinal direction.

Hereinafter, the seat moving structure 100 is described in detail with reference to FIG. 3 to FIG. 5.

(Seat Frame)

Figure 3:
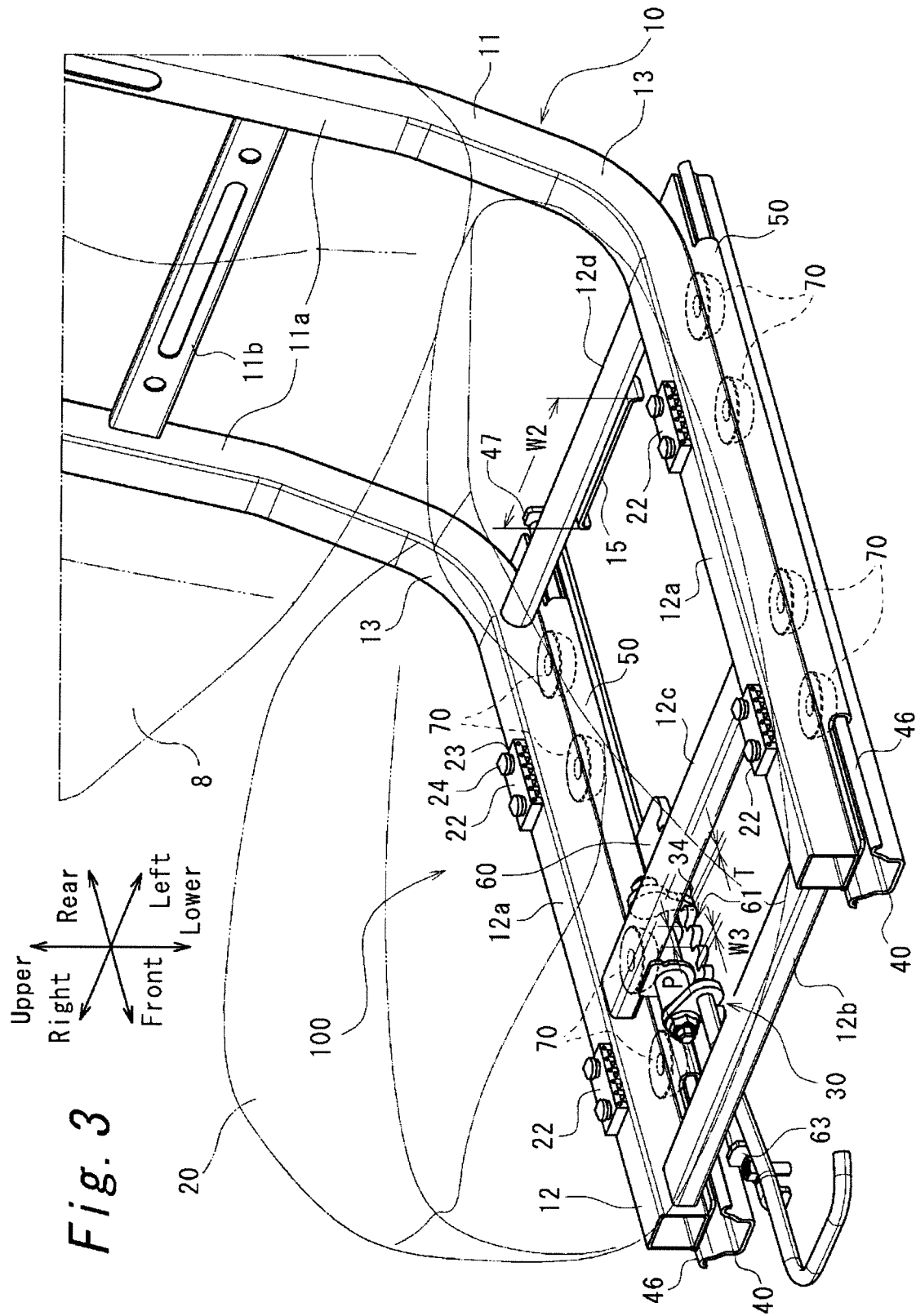
FIG. 3 is a perspective view showing the seat moving structure.

FIG. 3 is a perspective view showing the seat moving structure 100, and the seat back 8 and the seat cushion 20 are shown in a transparent manner. As shown in FIG. 3, the seat frame 10 includes: an upper seat frame portion 11 supporting the seat back 8; a bottom seat frame portion 12 supporting the seat cushion 20; and a bent portion 13 bending frontward from a lower end portion of the upper seat frame portion 11 and connected to the bottom seat frame portion 12.

The upper seat frame portion 11 is formed of a plurality of square pipes. That is, the upper seat frame portion 11 includes: a pair of right and left upper pipes 11a inclining rearward as extending upward; and an upper cross pipe 11b connecting these upper pipes 11a in a vehicle width direction.

The bottom seat frame portion 12 is formed of a plurality of pipes. That is, the bottom seat frame portion 12 includes: a pair of right and left bottom pipes 12a extending frontward from the bent portion 13; and first to third bottom cross pipes 12b to 12d connecting these bottom cross pipes 12a laterally. With respect to the bottom seat frame portion 12, although the third bottom cross pipe 12d is formed of a round pipe, other pipes are formed of a square pipe.

The first bottom cross pipe 12b is positioned at front end of the bottom pipes 12a. The third bottom cross pipe 12d is positioned at rear end of the bottom pipes 12a. The second bottom cross pipe 12c is positioned between the first bottom cross pipe 12b and the third bottom cross pipe 12d and closer to the first bottom cross pipe 12b.

Figure 4:
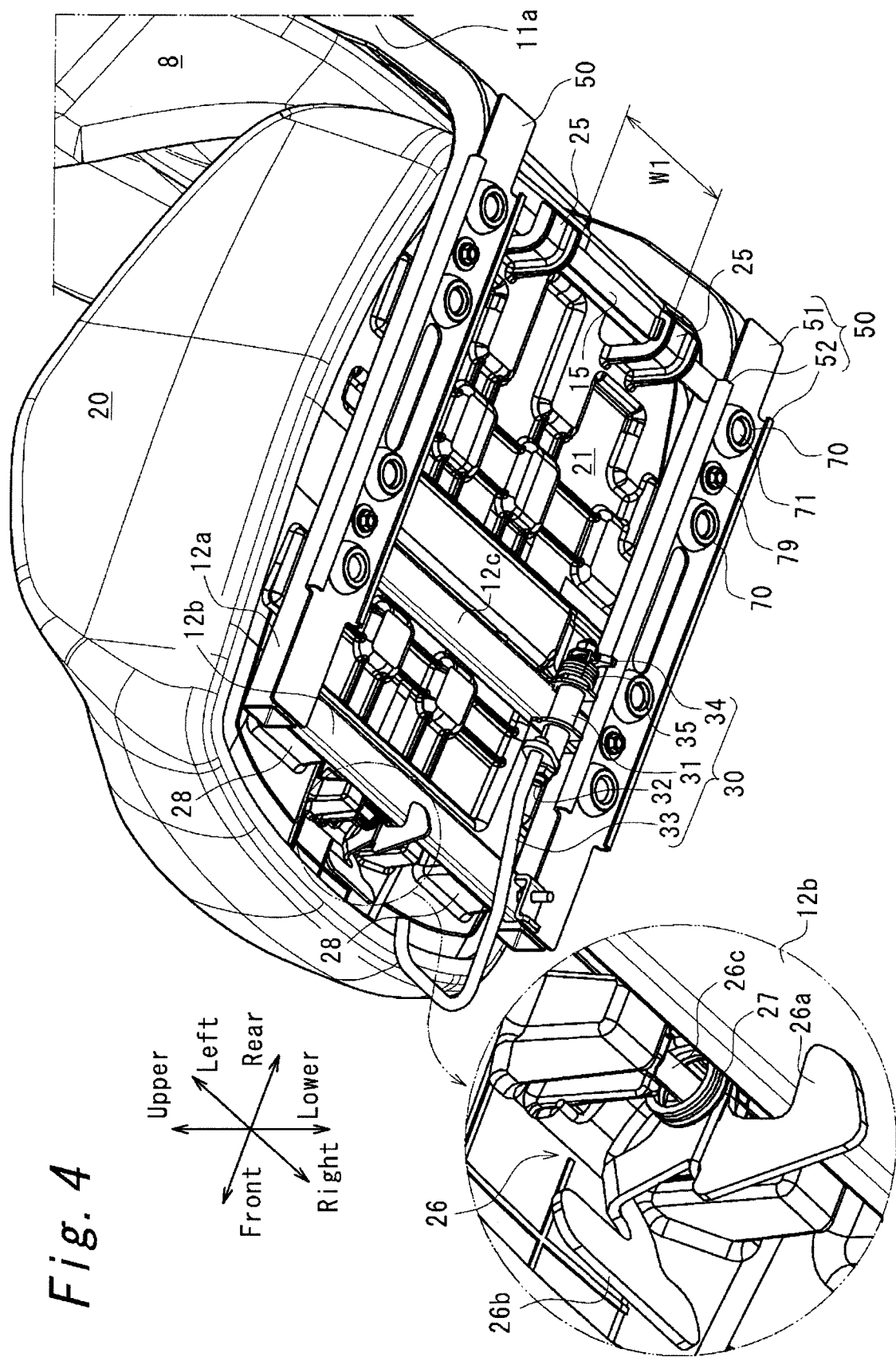
FIG. 4 is a perspective view of the seat as viewed from below.

FIG. 4 is a perspective view showing the seat 7 as viewed from below. As shown in FIG. 4, a breakaway-prevention rail 50 which prevents the seat 7 from breaking away upward from the seat rail 40 is fixed on lower walls of the pair of right and left bottom pipes 12a respectively using fastening bolts 79. The breakaway-prevention rail 50 is fixed at two positions, that is, at front and rear positions arranged in the longitudinal direction. Further, on a lower surface of each of the pair of right and left bottom pipes 12a, pairs of front and rear seat sliders 70 are fixed using fastening bolts 71 with the breakaway-prevention rail 50 interposed therebetween.

A slide position fixing mechanism 30 is disposed on a right end portion of the second bottom cross pipe 12c. The slide position fixing mechanism 30 fixes a slide position of the seat 7 in a longitudinal direction in cooperation with a slide guide 60 (see FIG. 3) mounted on the seat rail 40. In FIG. 4, the slide position fixing mechanism 30 engages with the slide guide 60 (not shown in the drawing), and is positioned at a lock position where the seat 7 is fixed in a longitudinal direction.

As shown in FIG. 3, a bracket 15 having a U shape in cross section opening downward as viewed in a longitudinal direction is fixed by welding to a lower surface of the third bottom cross pipe 12d at an approximately center position in a width direction.

(Seat Cushion)

With further reference to FIG. 4, the seat cushion 20 includes a seat cushion bottom plate 21 made of a resin or metal on a bottom portion of the seat cushion 20. A seat damper 22 is attached to each four corner of the seat cushion bottom plate 21 at positions corresponding to the bottom seat frame portion 12. That is, in a state where the seat cushion 20 is assembled to the bottom seat frame portion 12, the seat dampers 22 are interposed between the seat cushion 20 and the bottom seat frame portion 12 in a vertical direction.

Each seat damper 22 is formed of an elastic member (for example, rubber), and elastically supports the seat cushion 20 on an upper surface of the bottom seat frame portion 12. The seat damper 22 has an upper surface on which engaging projections 23 extending upward are formed. An enlarged diameter portion 24 is formed on an upper end of the engaging projection 23. The seat damper 22 is attached to the seat cushion bottom plate 21 by inserting the enlarged diameter portions 24 into attachment holes formed in the seat cushion bottom plate 21.

As shown in FIG. 4, a pair of right and left hinges 25 is integrally formed on a rear end of the seat cushion bottom plate 21. The hinge 25 has a downward extending portion, and a lower end portion of the downward extending portion bends rearward, thus the hinge 25 is shaped in an L shape as viewed in a side view. A distance W1 between the pair of right and left hinges 25 in a lateral direction is set approximately equal to or slightly larger than a width W2 of the bracket 15 in the lateral direction (see FIG. 3).

A seat cushion fixing hook 26 is mounted on a front end of the seat cushion bottom plate 21. The seat cushion fixing hook 26 includes: a hook portion 26a extending rearward at a lower end portion of the seat cushion fixing hook 26; a grip portion 26b extending horizontally at an upper portion of the seat cushion fixing hook 26; and rotary shaft portion 26c extending in a lateral direction at an approximately center portion of the seat cushion fixing hook 26 in a vertical direction. The seat cushion fixing hook 26 is supported on the seat cushion bottom plate 21 by the rotary shaft portion 26c in a rotatable manner about an axis of the rotary shaft portion 26c.

A coil spring 27 is interposed between the seat cushion fixing hook 26 and the seat cushion bottom plate 21. The coil spring 27 biases the seat cushion fixing hook 26 with respect to the seat cushion bottom plate 21 in a direction that the hook portion 26a is rotated rearward about the axis of the rotary shaft portion 26c (a counterclockwise direction as viewed in a left side view).

A pair of leg portions 28 which projects downward is integrally formed on the seat cushion bottom plate 21 at both right and left sides of the seat cushion fixing hook 26.

(Slide Position Fixing Mechanism)

The slide position fixing mechanism 30 includes: a rod holder 31 fixed on the second bottom cross pipe 12c; a rotary rod 32 extending in a longitudinal direction and rotatably supported on the rod holder 31; a bar handle 33 connected to the front end of the rotary rod 32 by way of a bracket; a slide position fixing hook 34 connected to a rear end of the rotary rod 32; and a coil spring 35. At the lock position, the front end of the bar handle 33 extends toward the inside in a width direction of the seat 7 in an approximately horizontal plane, and the slide position fixing hook 34 extends downward.

The rod holder 31 rotatably supports the rotary rod 32 about an axis of the rotary rod 32. The coil spring 35 is interposed between the slide position fixing hook 34 and the rod holder 31. The coil spring 35 biases the slide position fixing hook 34 in a direction that the slide position fixing hook 34 is rotated in a clockwise direction as viewed in a front view about an axis of the rotary rod 32 with respect to the rod holder 31.

(Seat Rail)

As shown in FIG. 3, the seat rails 40 extend in a longitudinal direction just below the pair of right and left bottom pipes 12a. The seat rails 40 are made of metal (for example, iron or stainless steel). As shown in FIG. 2, the seat rails 40 are fixed to upper surfaces of the seat cross members 5 by fastening bolts 41 at a front end portion and a rear end portion of the seat rails 40.

Figure 5:
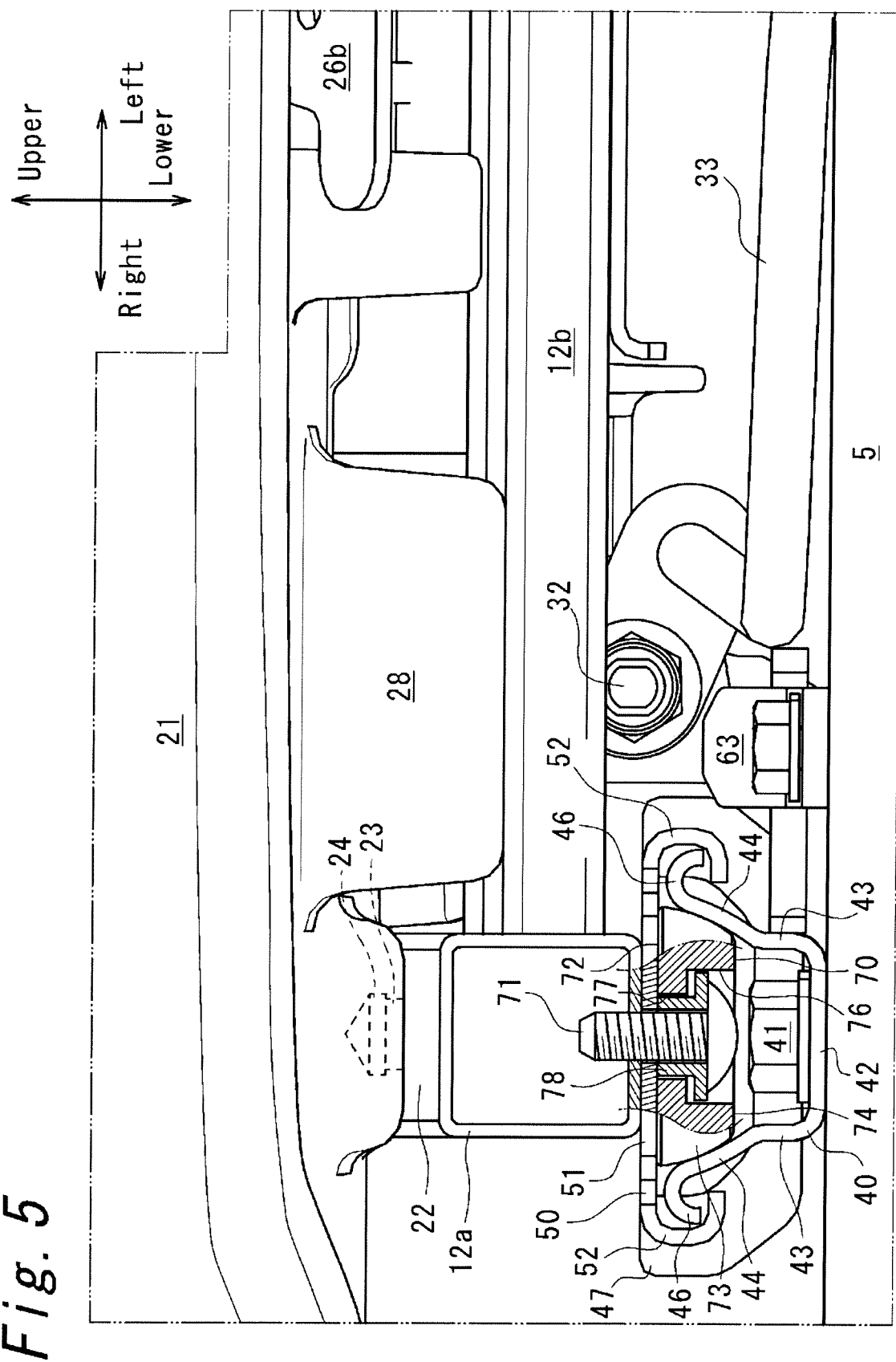
FIG. 5 is a front view of a seat slider and surrounding of the seat slider in an enlarged manner.

FIG. 5 is an enlarged view of the seat rail 40 which is provided on a right side and the surrounding of the seat rail 40 as viewed from a front side. As shown in FIG. 5, a cross-sectional shape of the seat rail 40 is formed such that an upper side of the seat rail 40 is opened, and an opening width is increased toward upward in a stepwise manner.

More specifically, the seat rail 40 includes: a bottom surface portion 42 attached to an upper surface of the seat cross member 5; a pair of right and left lower vertical wall portions 43 bending from the both right and left end portions of the bottom surface portion 42 and extending upward; a pair of right and left slide wall portions 44 (rail support surface portions) bending from upper ends of the lower vertical wall portions 43 outward in a width direction of the seat rail 40 and extending upward in a curved manner. Flange portions 46 are formed on upper end portions of the slide wall portions 44. The flange portions 46 are formed in a reverse U shape to bend outward in a width direction of the seat rail 40 and downward respectively.

Figure 6:
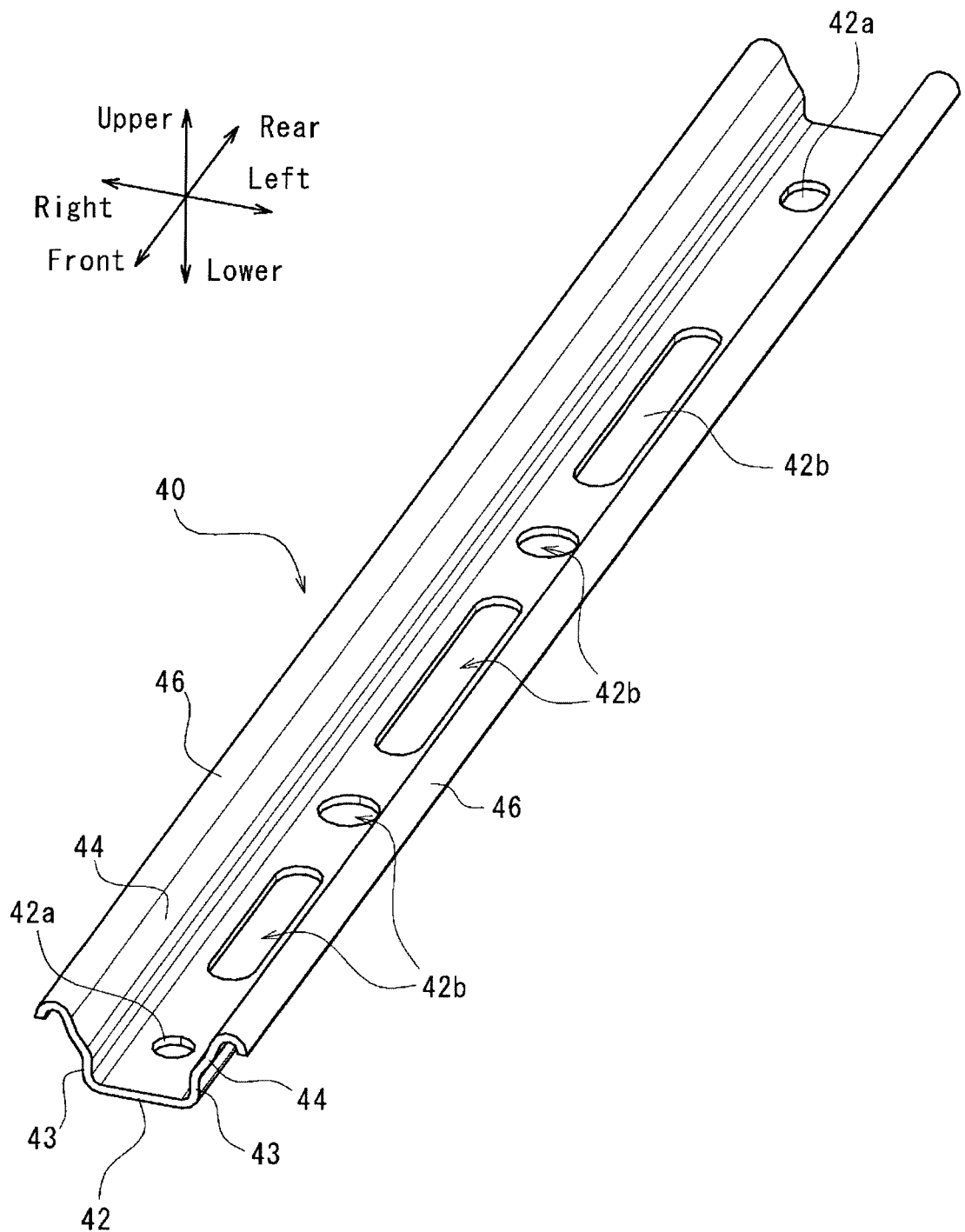
FIG. 6 is a perspective view of a seat rail.

FIG. 6 is a perspective view showing the seat rail 40. As shown in FIG. 6, a bolt insertion hole 42a through which the fastening bolt 41 (see FIG. 2) passes is formed at each of a front end portion and a rear end portion of the bottom surface portion 42. A plurality of opening portions 42b is formed in a penetrating manner in the vertical direction between the bolt insertion holes 42a in the longitudinal direction. The plurality of opening portions 42b includes a plurality of circular holes and a plurality of elongated holes which are arranged in a row in a spaced-apart manner in the longitudinal direction.

As shown in FIG. 2, a rear stopper 47 is provided on a rear end portion of the right seat rail 40. The rear stopper 47 is a plate-like member which is formed so as to protrude toward both sides in a width direction from the seat rail 40 as viewed in front view.

As shown in FIG. 5, the pair of right and left slide wall portions 44 extends in a curved surface shape in a downwardly inclined direction toward a center side of the seat rail 40 in the width direction, and is formed into an approximately V shape as viewed in front view. Specifically, the right and left slide wall portions 44 are curved in arcuate shapes which have a common center positioned on a center axis of the seat slider 70 in the width direction above the slide wall portions 44 and, further, is curved outward in the width direction in a reverse U shape tangentially and continuously at the flange portions 46 formed on upper end portions of the right and left slide wall portions 44 respectively. The seat slider 70 is formed to slide in the longitudinal direction in a state where the seat slider 70 is brought into contact with the pair of right and left slide wall portions 44 from above.

(Breakaway-Prevention Rail)

As shown in FIG. 4, the breakaway-prevention rail 50 includes: an attachment flange portion 51 attached to a lower surface of the bottom pipe 12a; and a pair of right and left guide portions 52 which are formed on both right and left sides portions of the attachment flange portion 51. The attachment flange portion 51 extends over the entire length of the bottom pipe 12a in a longitudinal direction. The pair of right and left guide portions 52 is provided corresponding to positions where the seat sliders 70 are attached, and is shorter than the attachment flange portion 51 in the longitudinal direction.

As shown in FIG. 5, the pair of right and left guide portions 52 extends outward in a width direction from both side portions of the attachment flange portion 51 and, further, is curved downward and inward in the width direction, so that a cross-sectional shape of the pair of right and left guide portions 52 is formed into an approximately U shape which opens inward in the width direction.

In a state where the seat 7 is assembled to the seat rails 40, the flange portions 46 are positioned inside the guide portions 52 of the breakaway-prevention rail 50. That is, the movement of the seat 7 in the vertical direction and in the width direction is restricted by the flange portions 46 of the seat rails 40 at the guide portions 52 of the breakaway-prevention rails 50.

In the case where the seat 7 is positioned at the rear end position or in the case where the seat 7 moves rearward beyond the rear end position, the guide portion 52 is brought into contact with the rear stopper 47 provided on the rear end portion of the seat rail 40 from a front side.

(Slide Guide)

As shown in FIG. 3, a slide guide 60 is fixed by welding on a left side portion of the seat rail 40 on a right side. The slide guide 60 is a plate member made of metal, and on a left edge portion of the slide guide 60, a plurality of engaging recessed portions 61 are formed at a predetermined pitch P in a longitudinal direction. The engaging recessed portions 61 are formed in an approximately U shape such that the engaging recessed portions 61 open toward a left side as viewed in a top view.

The engaging recessed portions 61 are formed at positions where the slide position fixing hook 34 positioned at a lock position is engageable with the engaging recessed portions 61. An opening width W3 is set to a size corresponding to a thickness T of the slide position fixing hook 34. Formed pitch W4 (see FIG. 2) in a longitudinal direction between the engaging recessed portions 61 at a frontmost end and a rearmost end is set to approximately 150 mm. That is, the seat 7 is configured to have a seat slide amount of approximately 150 mm ranging from a front end position where the slide position fixing hook 34 is engaged with the engaging recessed portions 61 positioned at a frontmost end to a rear end position where the slide position fixing hook 34 is engaged with the engaging recessed portions 61 positioned at a rearmost end.

A front stopper 63 is attached to the seat cross member 5. The front stopper 63 is formed in an L shape as viewed in a side view. An upper end of the front stopper 63 projects upward from the seat cross member 5, and the upper end oppositely faces a front end of the rod holder 31 of the slide position fixing mechanism 30 from a front side. The front stopper 63 is formed such that the front stopper 63 is brought into contact with a front end of the rod holder 31 when the seat 7 is positioned at the front end position or the seat 7 is further moved frontward beyond the front end position.

That is, the breakaway of the seat 7 from the seat rail 40 in a longitudinal direction is prevented by the rear stopper 47 and the front stopper 63. The front stopper 63 is detachably attached by fastening bolt. The front stopper 63 is attached to the seat cross member 5 after the seat 7 is assembled to the seat rail 40.

(Seat Slider)

The seat slider 70 can be made of a solid hard resin excellent in load resistance, abrasion resistance, low friction properties, and lubrication properties. With respect to Rockwell hardness stipulated in D785 of American society for testing and materials (ASTM), Rockwell hardness of the seat slider 70 is set to a value which falls within a range of from 78 to 85 inclusive by an M scale. As a hard resin having abrasion resistance, for example, hard nylon, hard urethane, a fluorine resin, a POM resin or the like can be used.

As shown in FIG. 4, the pair of front and rear seat sliders 70 is mounted on each four corner of lower surfaces of the bottom pipes 12a of the seat frame 10 respectively in a state where the breakaway-prevention rail 50 is vertically interposed between the lower surface of the bottom pipe 12a and the pairs of seat sliders 70. Each seat slider 70 is positioned between the pair of right and left guide portions 52 mounted on the breakaway-prevention rail 50 in the vehicle width direction.

With further reference to FIG. 5, the seat slider 70 is formed into a spherical shape. More specifically, the seat slider 70 is formed such that a spherical body is cut at a position below an equator line of the spherical body in a horizontal direction thus forming a lower semispherical body portion, and the lower semispherical body portion is further cut at a lower end portion thereof in a horizontal direction. The seat slider 70 includes: an upper surface portion 72 which is attached to a lower surface of the attachment flange portion 51 of the breakaway-prevention rail 50; a spherical portion 73 (seat rail contact portion) having a spherical shape extending downward from a peripheral portion of the upper surface portion 72; and a lower surface portion 74 connected to a lower edge portion of the spherical portion 73 in the horizontal direction. Chamfering is applied between the upper surface portion 72 and the spherical portion 73 and between the lower surface portion 74 and the spherical portion 73.

In a cross-sectional shape shown in FIG. 5, the upper surface portion 72 extends in a horizontal direction along a lower surface of the attachment flange portion 51 of the breakaway-prevention rail 50. The spherical portion 73 extends in a curved shape so as to protrude toward the slide wall portions 44. Specifically, the spherical portion 73 is formed into a spherical shape which has a center positioned on the center line of the seat slider 70 in the width direction above the spherical portion 73, and extends, as viewed in front view, in an arcuate shape in a direction inclined toward the center of the seat slider 70 in the width direction as extending downward.

More specifically, the spherical portion 73 is formed to have a radius of curvature different from a radius of curvature of the slide wall portion 44 (that is, a portion excluding the flange portion 46) extending in a curved surface shape. In this embodiment, a radius of curvature of the spherical portion 73 is larger than a radius of curvature of the slide wall portion 44 and hence, the spherical portion 73 is supported on upper portions of the slide wall portions 44 having a curved surface shape and/or the U-shaped flange portions 46.

That is, the seat slider 70 is configured such that, in a state where the seat slider 70 is placed on the seat rail 40, the spherical portion 73 projecting downward is brought into approximately point contact with the pair of right and left slide wall portions 44. The seat slider 70 is attached to the seat rail 40 without requiring a lubricant.

As shown in FIG. 4, the pair of front and rear seat sliders 70 is mounted on each four corner of the seat 7 respectively, that is, the seat 7 is supported at eight points per one seat. With such a configuration, a surface pressure at the spherical portion 73 being brought into contact with the slide wall portions 44 of the seat rail 40 is set to a predetermined value or below and hence, the deformation or collapse of the spherical portion 73 can be suppressed.

As shown in FIG. 5, a lower surface portion 74 of the seat slider 70 is formed with a counterbore portion 76 which is recessed upward, and an attachment hole 77 which penetrates the counterbore portion 76 from a hole bottom of the counterbore portion 76 to the upper surface portion 72.

A fastening bolt 71 is inserted into the counterbore portion 76 and the attachment hole 77 from below via a collar 78, and is fastened to a lower surface of the bottom pipe 12a with the attachment flange portion 51 of the breakaway-prevention rail 50 interposed between the seat slider 70 and the lower surface of the bottom pipe 12a. That is, by fastening the fastening bolt 71 via the collar 78, the seat slider 70 made of a resin is not directly fastened by the fastening bolt 71 and hence, buckling of the counterbore portion 76 is prevented. The attachment flange portion 51 of the breakaway-prevention rail 50 is formed with a bolt insertion hole through which the fastening bolt 71 passes at the position corresponding to the seat slider 70.

With further reference to FIG. 6, the plurality of opening portions 42b is formed in the bottom surface portion 42 of the seat rail 40. The seat slider 70 is brought into contact with the slide wall portions 44 of the seat rail 40, and is not brought into contact with the bottom surface portion 42b. Accordingly, the plurality of opening portions 42b does not overlap with the moving trajectory of the seat slider 70 which moves in a longitudinal direction on the seat rail 40 and hence, the penetration of the opening portions 42b in the vertical direction is maintained irrespective of the positions of the seat slider 70.

(Slide Operation of Seat)

In an operation of sliding the seat 7 in a longitudinal direction, firstly, the bar handle 33 of the slide position fixing mechanism 30 is rotated in a counterclockwise direction as viewed in a front view (see FIG. 5) against a biasing force generated by the coil spring 35. With such an operation, the slide position fixing hook 34 positioned at a lock position is rotated in a counterclockwise direction as viewed in a front view by way of the rotary rod 32. As a result, the slide position fixing hook 34 is moved to an unlock position away from the engaging recessed portion 61.

Next, the seat 7 is slid in a longitudinal direction. In this operation, the seat 7 slides on the pair of right and left slide wall portions 44 of the seat rail 40 by way of the seat sliders 70 in a longitudinal direction. After the seat 7 being slid to a desired longitudinal direction position, the bar handle 33 is rotated in a clockwise direction as viewed in a front view by a biasing force generated by the coil spring 35 so that the slide position fixing hook 34 is positioned at a lock position where the slide position fixing hook 34 engages with one of a plurality of engaging recessed portions 61.

Due to the engagement of the slide position fixing hook 34 with one of the plurality of engaging recessed portions 61 of the slide guide 60, the seat 7 is positioned and fixed at a longitudinal direction position corresponding to the engaging recessed portion 61. The seat 7 is slidable in a longitudinal direction between a state where the seat 7 is positioned at the engaging recessed portion 61 on a frontmost end and a state where the seat 7 is positioned at the engaging recessed portion 61 on a rearmost end. The seat 7 is positioned at a predetermined pitch P between these states.

(Method of Assembling Seat Cushion)

In assembling the seat cushion 20 to the bottom seat frame portion 12, firstly, while maintaining the seat cushion 20 in a frontwardly raised posture, the pair of right and left hinges 25 disposed at a rear end of the seat cushion 20 is engaged to the third bottom cross pipe 12d from upper front thereof by adjusting the position of the seat cushion 20 such that the bracket 15 is positioned between the pair of hinges 25.

Next, the seat cushion 20 is rotated downward by way of the hinges 25 about an axis of the third bottom cross pipe 12d. At this stage of operation, the grip portion 26b of the seat cushion fixing hook 26 is pulled upward so as to retract the hook portion 26a in advance, the seat cushion 20 is placed on the bottom seat frame portion 12 and, thereafter, the hook portion 26a is rotated rearward due to a biasing force of the coil spring 27, thus the hook portion 26a engages with the first bottom cross pipe 12b.

In this state, the seat cushion 20 is elastically supported on the bottom seat frame portion 12 by the seat dampers 22, and a front portion of the seat cushion 20 is supported on the first bottom cross pipe 12b by way of the pair of leg portions 28. On the other hand, by releasing the engagement of the first bottom cross pipe 12b with the hook portion 26a by pulling the grip portion 26b upward, the seat cushion 20 can be removed from the bottom seat frame portion 12.

According to the seat moving structure for a utility vehicle having the above-mentioned configuration, the following advantageous effects can be acquired.

(1) The seat slider 70 is supported on the slide wall portions 44 in a point contact state and hence, contact areas between the seat slider 70 and the slide wall portions 44 can be made small. Further, the seat slider 70 is made of a resin and hence, the seat slider 70 can easily follow in conformity with the slide wall portions 44 thus decreasing friction resistance between the seat slider 70 and the slide wall portions 44. Accordingly, a load necessary for moving the seat 7 in the longitudinal direction can be reduced. Further, the structure is adopted where the seat slider 70 moves in the longitudinal direction on the slide wall portions 44 and hence, a moving amount of the seat 7 in the longitudinal direction can be easily increased. Accordingly, a load necessary for moving the seat 7 in the longitudinal direction can be reduced while increasing a moving amount of the seat 7 in the longitudinal direction.

(2) Even when a foreign substance exists on the seat rail 40, the foreign substance can be easily discharged to the outside from the seat rail 40 through the opening portions 42a. With such a configuration, biting of the foreign substance between the seat slider 70 and the slide wall portion 44 is suppressed and hence, the movability of the seat 7 in the longitudinal direction can be easily and favorably maintained.

(3) The opening portions 42b formed in the bottom surface portion 42 positioned below the seat sliders 70 are not closed by the seat sliders 70 which move on the slide wall portions 44 of the seat rail and hence, properties of discharging a foreign substance to the outside can be easily maintained irrespective of the positions of the seat sliders 70.

(4) The seat slider 70 is made of an wear resistant resin and hence, a friction coefficient between the seat slider 70 and the slide wall portion 44 can be suppressed to a low level. Accordingly, a load necessary for moving the seat 7 in the longitudinal direction is further reduced.

(5) The seat slider 70 is formed such that the seat slider 70 is slidable in a longitudinal direction with respect to the seat rail 40 without requiring a lubricant and hence, there is no possibility that the seat slider 70 made of a resin is exposed to a lubricant such as a lubricating oil or grease. Accordingly, the degradation of the seat slider 70 made of a resin due to a lubricant can be prevented. Further, a lubricant is not interposed between the seat slider 70 and the seat rail 40 and hence, a foreign substance minimally adheres to the sliding portion whereby wear of the sliding portion due to a foreign substance and biting of the foreign substance can be prevented.

Particularly, in a utility vehicle which can travel on an uneven ground road and in which a foreign substance such as mud, sand, or water scatters in a riding space, it is possible to suppress the adhesion and biting of a foreign substance in the sliding portion between the seat slider 70 and the seat rail 40 and hence, the above-mentioned advantageous effects can be preferably realized.

(6) The spherical portion 73 of the seat slider 70 is formed into a curved surface shape protruding toward the slide wall portions 44 of the seat rail 40 and hence, contact areas between the seat slider 70 and the slide wall portions 44 can be reduced whereby friction resistance between the seat slider 70 and the slide wall portions 44 is reduced. With such a configuration, a load necessary for moving the seat 7 in the longitudinal direction is further reduced.

(7) The pair of slide wall portions 44 of the seat rail 40 disposed in the width direction of the seat rail 40 are formed into an approximately V shape as viewed in front view and hence, the seat slider 70 is guided toward a center side in the width direction of the seat rail 40 by the pair of slide wall portions 44 having a V shape in cross section by way of the spherical portion 73. With such a configuration, the seat 7 can be moved in the longitudinal direction in a stable manner.

(8) The spherical portion 73 of the seat slider 70 is formed into a spherical shape protruding toward the slide wall portions 44 of the seat rail 40 and hence, the spherical portion 73 is brought into point contact with the slide wall portions 44. With such a configuration, contact areas between the spherical portion 73 and the slide wall portions 44 are further reduced so that friction resistance between the spherical portion 73 and the slide wall portions 44 is reduced. Accordingly, a load necessary for moving the seat 7 in the longitudinal direction can be further reduced.

(9) The spherical portion 73 of the seat slider 70 and the slide wall portions 44 are formed so as to have the different radii of curvature and hence, the spherical portion 73 can easily follow along the slide wall portions 44 while making contact portions between the spherical portion 73 and the slide wall portions 44 small. Accordingly, the seat 7 can be easily moved more smoothly.

Second Embodiment

A seat moving structure for a utility vehicle according to a second embodiment is described with reference to FIG. 7 to FIG. 11. In the description made hereinafter, the technical feature which makes the second embodiment differ from the first embodiment is mainly described, and members identical with the corresponding members of the first embodiment are given the same symbols and the repeated description of these members is omitted.

Figure 7:
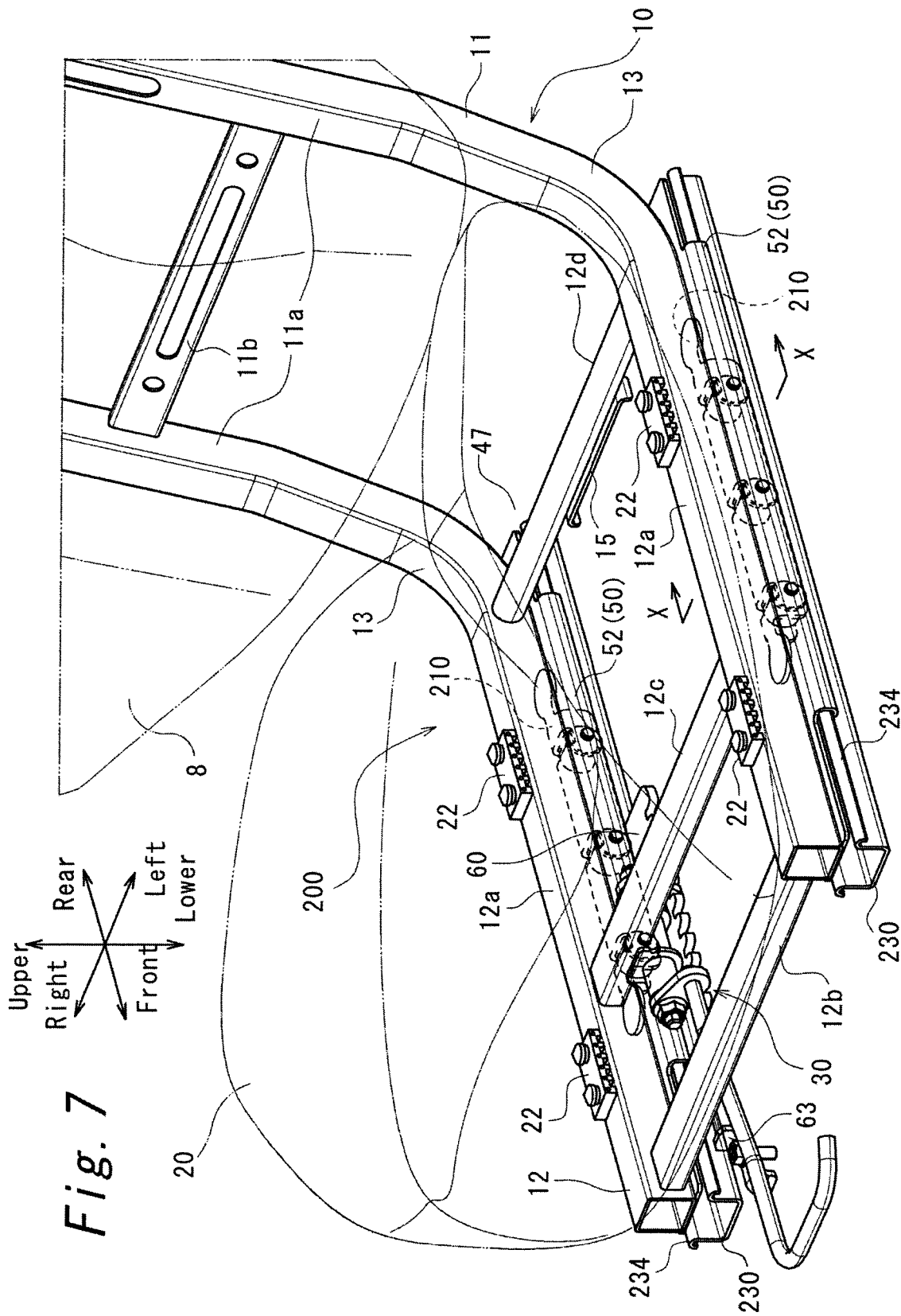
FIG. 7 is a perspective view showing a seat moving structure according to the second embodiment.

FIG. 7 is a perspective view showing a seat moving structure 200 according to the second embodiment, and a seat back 8 and a seat cushion 20 are shown in a transparent manner. As shown in FIG. 7, the seat moving structure 200 includes roller assemblies 210 which form a seat rail contact portion of the present invention, and seat rails 230 which form a rail support surface portion of the present invention. That is, the seat moving structure 200 differs from the seat moving structure 100 of the first embodiment with respect to the technical feature in that the seat moving structure 200 includes the roller assemblies 210 and the seat rails 230 in place of the seat sliders 70 and the seat rails 40.

(Roller Assembly)

Figure 8:
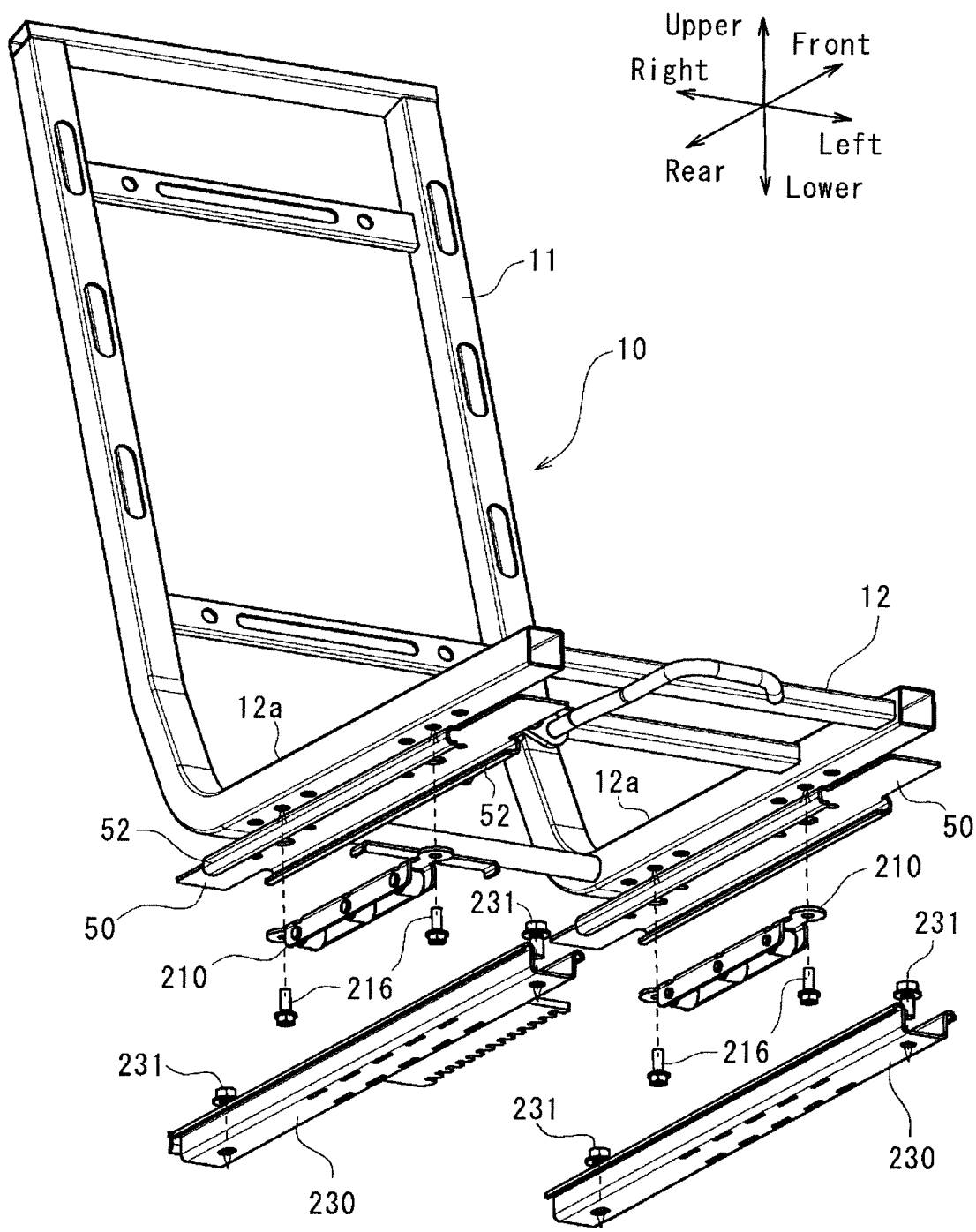
FIG. 8 is an exploded perspective view of the seat moving structure shown in FIG. 7.

FIG. 8 is an exploded perspective view of the seat moving structure 200. As shown in FIG. 8, the roller assemblies 210 are mounted on lower surfaces of a pair of right and left bottom pipes 12a respectively in a state where a breakaway-prevention rail 50 is interposed between a lower surface of a bottom pipe 12a and the roller assembly 210 respectively in the vertical direction.

With further reference to FIG. 7, the roller assembly 210 is disposed between a pair of right and left guide portions 52 mounted on the breakaway-prevention rail 50 in the vehicle width direction. The roller assembly 210 is disposed at an approximately center portion of the bottom pipe 12a in the longitudinal direction. Further, the roller assembly 210 is shorter than the pair of right and left guide portions 52 in the longitudinal direction, and the roller assembly 210 overlaps with the guide portions 52 in the longitudinal direction as a whole as viewed in a side view of the vehicle.

Figure 9:
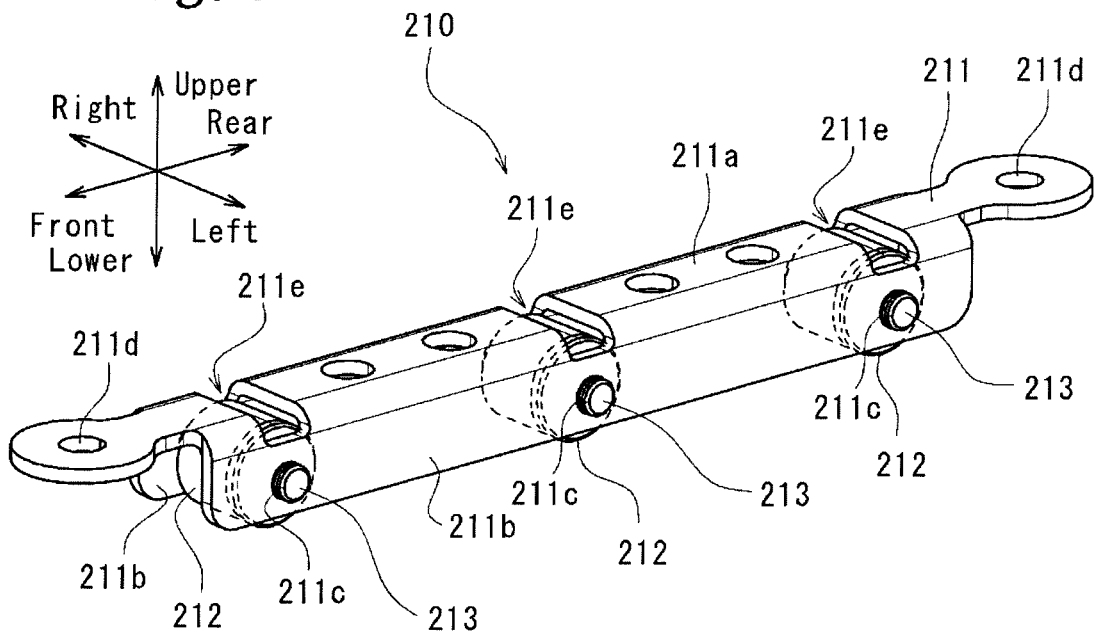
FIG. 9 is a perspective view of a roller assembly.
Figure 10:
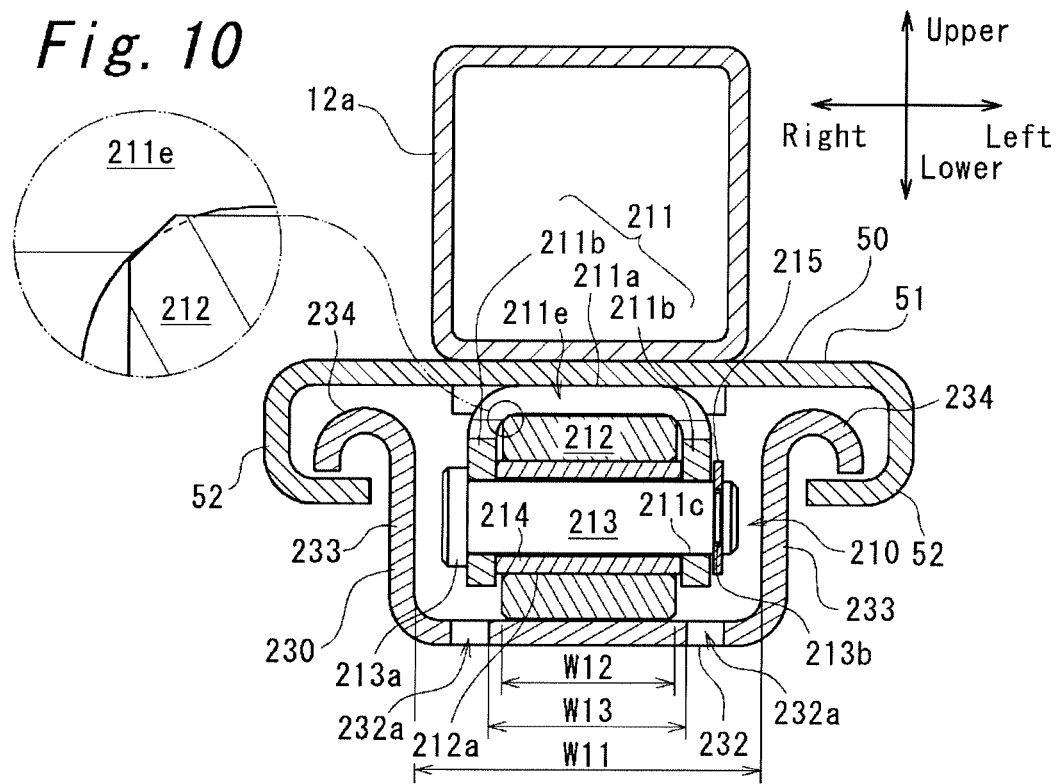
FIG. 10 is a cross-sectional view of FIG. 7 taken along a line X to X.

FIG. 9 is a perspective view showing the roller assembly 210. As shown in FIG. 9, the roller assembly 210 includes a roller holder 211 and rollers 212. FIG. 10 is a cross-sectional view of the roller assembly 210 taken along a line X-X in FIG. 7, and is a vertical cross-sectional view taken along an axis of the roller 212. As shown in FIG. 10, the roller assembly 210 further includes pins 213 each of which pivotally supports the roller 212 in a rotatable manner, bearings 214 each of which is fixed on an outer periphery of the pin 213, and circlips 215 each of which is fitted on a distal end portion of the pin.

The roller holder 211 has: an upper surface portion 211a extending substantially horizontally in the longitudinal direction at a top portion of the roller holder 211; and a pair of right and left side surface portions 211b extending downward from both end portions of the upper surface portion 211a in the vehicle width direction. Accordingly, the roller holder 211 is formed into a downwardly opened U shape in cross section orthogonal to the longitudinal direction of the roller holder 211.

A plurality of through holes 211c is formed in each of the pair of right and left side surface portions 211b in a penetrating manner in a lateral direction. In this embodiment, the plurality of through holes 211c is formed in each of the pair of right and left side surface portions 211b such that three through holes 211c are arranged equidistantly in the longitudinal direction. As viewed in a side view of the vehicle, the positions of three through holes 211c formed in the pair of right and left side surface portions 211b respectively are aligned with each other.

The pin 213 has: a flange portion 213a formed on a proximal end portion of the pin 213 by increasing a diameter of the pin 213; and an annular groove portion 213b formed in a distal end portion of the pin 213. The pin 213 extends in the lateral direction such that the pin 213 passes through the through holes 211c of the pair of right and left side surface portions 211b. A proximal end portion of the pin 213 is positioned on an outer surface side of one side surface portion 211b, and a distal end portion of the pin 213 is positioned on an outer surface side of the other side surface portion 211b. The circlip 215 is fitted on the groove portion.

The pin 213 is assembled to the pair of right and left side surface portions 211b. The roller 212 is rotatably assembled to an outer peripheral portion of the pin 213.

The roller 212 is formed such that an axis of the roller 212 extends in the vehicle width direction. The roller 212 is brought into contact with a bottom surface portion 232 of a seat rail 230 described later, and rolls on the bottom surface portion 232 in the longitudinal direction. Accordingly, an outer peripheral surface of the roller 212 forms a seat rail contact portion according to the present invention. The roller 212 is made of a resin, and is also made of the same material as the seat slider 70. A through hole 212a which penetrates the roller 212 in the lateral direction is formed in a center portion of the roller 212 in a radial direction. The bearing 214 extending in the lateral direction is press-fitted in the through hole 212a. The bearing 214 is an oil-less type bearing which does not require a lubricating oil.

The roller 212 is mounted on an outer peripheral portion of the pin 213 by way of the bearing 214. Accordingly, when the roller 212 rolls, an inner peripheral portion of the bearing 214 and an outer peripheral portion of the pin 213 slide relative to each other.

With reference to FIG. 9, the rollers 212 are mounted on the roller holder 211 in a rotatable manner by the pins 213 which are each inserted into three through holes 211c formed in the side surface portions 211b of the roller holder 211. Accordingly, three rollers 212 arranged equidistantly in the longitudinal direction are mounted on the roller assembly 210.

A pair of front and rear attachment holes 211d is formed in the upper surface portion 211a of the roller holder 211 in a vertically penetrating manner at a front end portion and a rear end portion of the roller holder 211. With reference to FIGS. 8 and 9, the roller assembly 210 is fixed by fastening to the lower surface of the bottom pipe 12a using fastening bolts 216 through the pair of front and rear attachment holes 211d formed in the roller holder 211 in a state where the breakaway-prevention rail 50 is interposed between the roller assembly 210 and the lower surface of the bottom pipe 12a in the vertical direction.

Further, cutout portions 211e extending in the lateral direction are formed in the roller holder 211 by cutting out the roller holder 211 at positions facing the rollers 212 to be assembled to the roller holder 211 from above. The cutout portion 211e is formed from the upper surface portion 211a to upper end portions of the side surface portions 211b positioned at both end portions of the upper surface portion 211a.

As shown in FIG. 10 in an enlarged manner, the roller 212 is attached to the roller holder 210 such that the roller 212 partially overlaps with the cutout portion 211e as viewed in front view.

As shown in FIG. 8, the seat rails 230 extend in the longitudinal direction just below the bottom pipes 12a respectively. The seat rails 230 are made of metal (for example, iron or stainless steel). Each seat rail 230 is fixed to upper surfaces of a pair of front and rear seat cross members 5 (see FIGS. 2 and 8) at a front end portion and a rear end portion of the seat rail 230 by fastening bolts 231.

As shown in FIG. 10, the seat rail 230 is formed in an upwardly opening U shape in cross section orthogonal to the longitudinal direction. More specifically, the seat rail 230 includes: a bottom surface portion 232 extending in the longitudinal direction at a bottom portion of the seat rail 230; a pair of right and left vertical wall portions 233 extending upward from both end portions of the bottom surface portion 232 in the vehicle width direction; and flange portions 234 bending outward in the width direction of the seat rail 230 and downward from upper end portions of the vertical wall portions 233 thus extending in a reverse U shape respectively. In the vehicle width direction, a width W11 between the pair of right and left vertical wall portions 233 is set larger than a width W12 of the roller 212.

The bottom surface portion 232 is formed such that the rollers 212 roll on a surface of the bottom surface portion 232. That is, the bottom surface portion 232 forms the rail support surface portion. A plurality of opening portions 232a is formed in the bottom surface portion 232 in a vertically penetrating manner.

Figure 11:
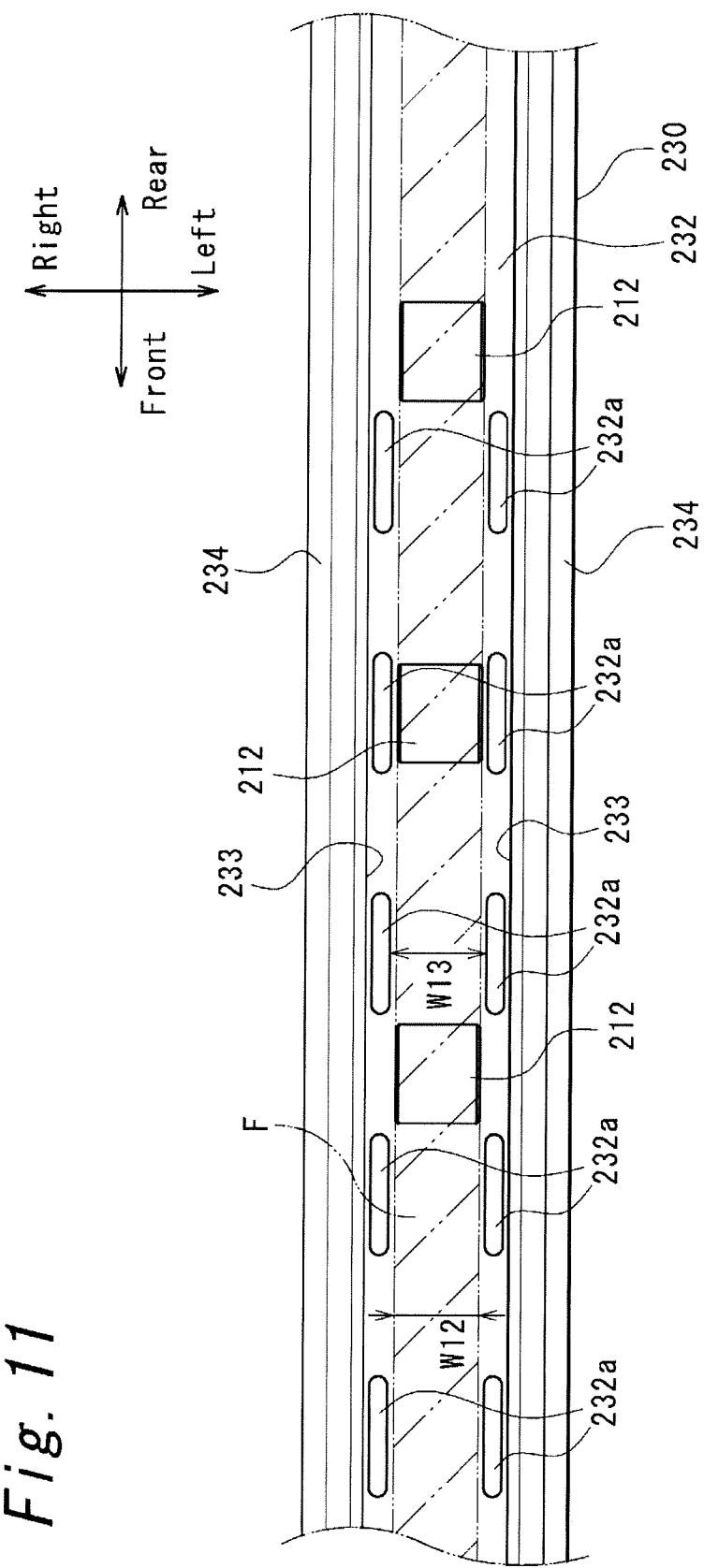
FIG. 11 is a plan view showing a relationship between the seat rail and a roller.

FIG. 11 is a plan view of the seat rail 230. The rollers 212 are also shown in FIG. 11 together the seat rail 230. As shown in FIG. 11, the plurality of opening portions 232a is formed in two rows in a spaced-apart manner from each other in the vehicle width direction. The opening portions 232a in each row are formed of a plurality of elongated holes disposed in a spaced-apart manner in the longitudinal direction. In the vehicle width direction, two rows of opening portions 232a are positioned at both sides of the rollers 212.

In other words, a width W13 between the opening portions 232a which are formed in two rows in the vehicle width direction is set larger than the width W12 of the roller 212. As a result, the opening portions 232a do not overlap with a moving trajectory F (indicated by hatching in FIG. 11) of the roller 212 when the seat 7 moves in the longitudinal direction and hence, the penetration of the opening portions 232a in the vertical direction is maintained irrespective of the positions of the rollers 212.

As shown in FIG. 10, in a state where the seat 7 is assembled to the seat rails 230, the flange portions 234 are positioned inside the guide portions 52 of the breakaway-prevention rail 50. That is, the movement of the seat 7 in the vertical direction and in the width direction is restricted by the flange portions 234 of the seat rails 230 at the guide portions 52 of the breakaway-prevention rails 50.

According to the seat moving structure 200 for a utility vehicle of the second embodiment, the following advantageous effects can be acquired.

(10) The roller 212 is brought into line contact with the bottom surface portion 232 of the seat rail 230 and hence, a contact area between the roller 212 and the bottom surface portion 232 is further reduced so that friction resistance is reduced. Further, even when a foreign substance exists on the bottom surface portion 232, the roller 212 easily gets over the foreign substance by rolling. With such a configuration, biting of a foreign substance between the roller 212 and the bottom surface portion 232 of the slide rail 230 is suppressed and hence, movability of the seat 7 in the longitudinal direction can be easily maintained more favorably.

(11) The roller assembly 210 has the plurality of rollers 212 and hence, the seat 7 can be moved in a stable manner in a state where a load acting on the roller assembly 210 from the seat 7 can be shared by the plurality of rollers 212. Further, by sharing a load by the plurality of rollers 212, a load acting on one roller 212 is reduced and hence, for example, a size of the roller 212 in the width direction can be made small whereby the roller assembly 210 can be formed in a compact shape in the width direction.

(12) The seat rail contact portion can be formed as the roller assembly 210 where the plurality of rollers 212 is assembled to the roller holder 211 and, at the same time, the plurality of rollers 212 can be collectively assembled to the seat 7 as the roller assembly 210. With such a configuration, operability of assembling the plurality of rollers 212 to the seat 7 can be improved.

(13) The cutout portions 211e are formed in the upper surface portion 211a of the roller holder 211 at the positions facing the rollers 212 and hence, interference between the rollers 212 and the upper surface portion 211a can be easily suppressed, and the roller assembly 210 can be formed in a compact shape in the vertical direction. Accordingly, the moving structure of the seat 7 can be formed in a compact shape in the vertical direction.

(14) According to the seat moving structure 100, the seat sliders 70 are guided on the seat rail 40 to the longitudinal direction of the seat rail 40 by the slide wall portion 44 formed in approximately V shape, while movement in the width direction regulated. The left and right seat rails 40 are disposed respectively corresponding to left and right of the seat 7. Thus, it is required that two directions in which each seat rail 40 guides the seat sliders 70 are parallel to each other. Therefore, in order to move the seat 7 smoothly, it is required that left and right seat rails 40 are attached such that parallelism among them is set with high accuracy. Further, it is also required that the left and right seat sliders 70 moving on the left and right seat rails 40 are disposed along respective straight lines which are parallel to each other.

On the contrary, according to the seat moving structure 200, rollers 212 roll and move on the flat bottom surface portion 232. Since the seat 7 moves along a direction in which the rollers 212 rolls and moves, the bottom surface portion 232 does not regulate the movement of the rollers 212 in the width direction. Thus, an above-described requirement for attaching the left and right seat rails 230 can be eased compared to the seat moving structure 100. Further, an above-described requirement for arrangement of the rollers 212 also can be eased compared to the seat moving structure 100.

Accordingly, in the seat moving structure 200 according to the second embodiment, accuracy in assembling the seat moving structure 200 to the body frame can be eased compared to the seat moving structure 100 of the first embodiment and hence, assembling operability can be improved.

In the above-mentioned embodiment, the seat slider 70 is formed of a solid resin member. However, a member which forms the seat slider 70 is not limited to such a member. It is sufficient for the seat slider 70 that at least the spherical portion 73 which is brought into contact with the slide wall portion 44 of the seat rail 40 be made of a resin. For example, the seat slider 70 may be formed using metal and the spherical portion 73 can be coated with a resin.

In the above-mentioned embodiment, the pair of front and rear seat sliders 70 is attached to the each four corner of the seat 7. However, the present invention is not limited to such a configuration. That is, one seat slider 70 may be attached to the each four corner of the seat 7 or three or more seat sliders 70 may be attached to the each four corner of the seat 7. In other words, it is sufficient that a surface pressure at a contact portion between the seat slider 70 and the seat rail 40 be set to a predetermined value or less.

In the above-mentioned embodiment, a radius of curvature of the spherical portion 73 of the seat slider 70 is set larger than a radius of curvature of the slide wall portion 44 of the seat rail 40. However, the present invention is not limited to such a configuration. That is, it is sufficient that the spherical portion 73 and the slide wall portion 44 differ from each other in radius of curvature, that is, a radius of curvature of the spherical portion 73 of the seat slider 70 may be set smaller than a radius of curvature of the slide wall portion 44.

Figure 12:
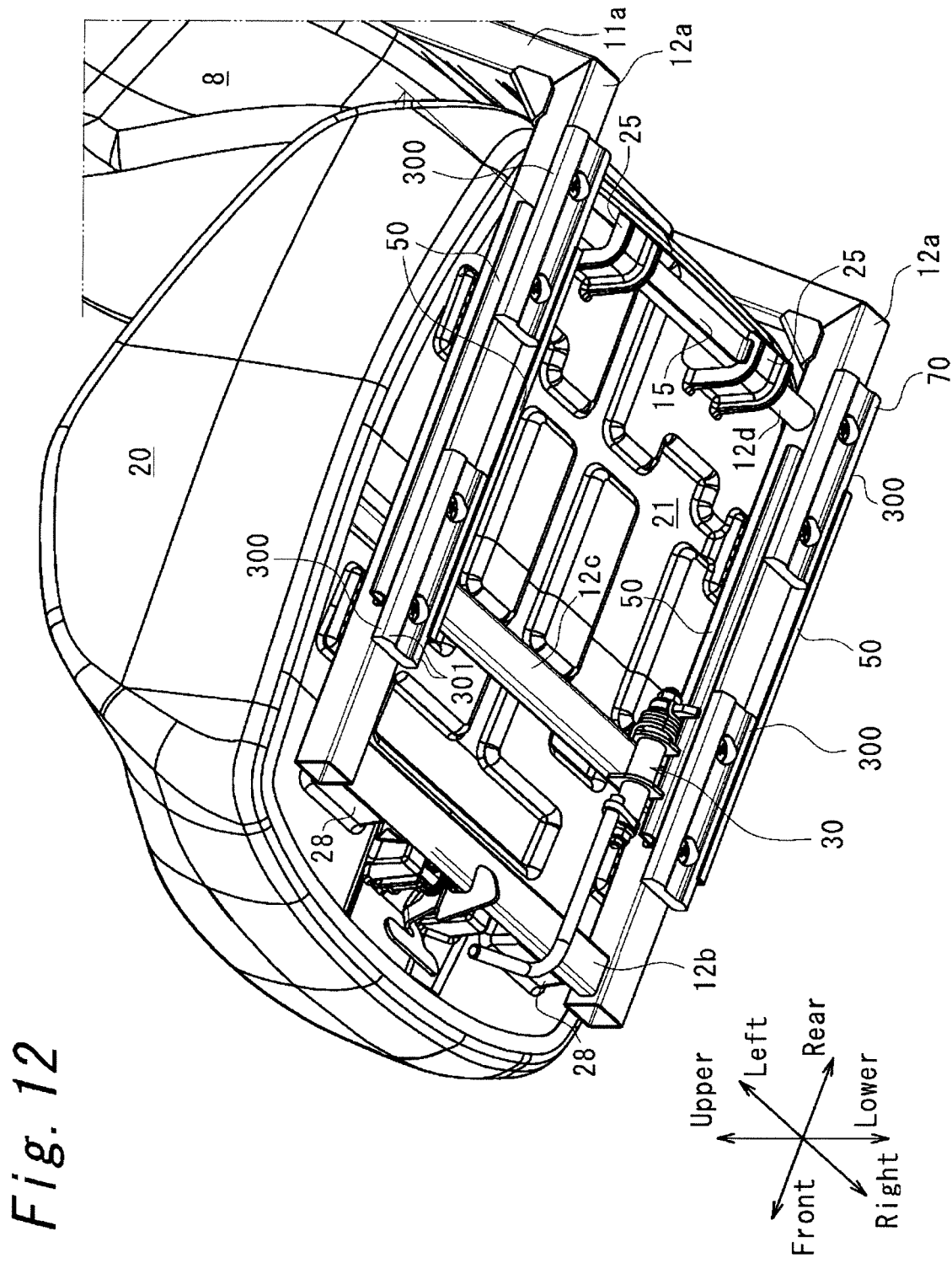
FIG. 12 is a perspective view of a seat, as viewed from below, provided with a seat slider according to modification example.

In the above-mentioned first embodiment, although the seat slider 70 is formed in a spherical shape, the present invention is not limited to such a configuration. That is, it is sufficient that the seat slider 70 be formed in a curved surface shape. For example, as shown in FIG. 12, a seat slider 300 may be formed so as to have curved surface portions 301 protruding in an arcuate shape toward slide wall portions 44 (see FIG. 5) in cross section as viewed in front view, and may be formed to extend such a cross-sectional shape in the fore-and-aft direction.

In this case, contact portions between the seat slider 300 and the slide wall portions 44 are formed in a line contact state extending in the longitudinal direction and hence, contact areas between the seat slider 300 and the slide wall portions 44 are reduced whereby friction resistance at such portions is reduced.

Various modifications and alterations can be made without departing from the spirit and the scope of the present invention described in claims.

What is claimed is:

1. A seat moving structure for a utility vehicle, the seat moving structure comprising:
    a seat; and
    a seat rail for guiding movement of the seat in a longitudinal direction of the seat,
    wherein:
    the seat has a seat rail contact portion which is in contact with the seat rail and fixed to a bottom of the seat;
    the seat rail has a rail support surface portion which supports the seat rail contact portion from below;
    the seat rail contact portion is made of a resin;
    the seat is movably supported in a line contact state or in a point contact state in the longitudinal direction of the seat on the rail support surface portion by the seat rail contact portion;
    the seat rail includes an opening portion defined in a vertically penetrating manner on a bottom portion;
    in a plan view, the opening portion does not overlap with a moving trajectory of the seat rail contact portion which is configured to move on the seat rail in the longitudinal direction of the seat;
    in a side view, the opening portion overlaps with the moving trajectory of the seat rail contact portion; and
    the opening portion is configured to remain in the vertically penetrating manner in a state where the seat rail is mounted to the utility vehicle.

2. The seat moving structure according to claim 1, wherein the resin is wear resistant.

3. The seat moving structure according to claim 1, wherein a lubricant is not interposed between the seat rail contact portion and the rail support surface portion.

4. The seat moving structure according to claim 1, wherein the seat rail contact portion has a curved surface shape protruding toward the rail support surface portion.

5. The seat moving structure according to claim 4, wherein the rail support surface portion of the seat rail includes a pair of rail support surface portions in a width direction, and each of the rail support surface portions is inclined downward toward a center of the seat rail in the width direction.

6. The seat moving structure according to claim 4, wherein the seat rail contact portion has a spherical shape.

7. The seat moving structure according to claim 4, wherein the rail support surface portion has a curved surface shape, and has a curvature different from a curvature of the seat rail contact portion.

8. The seat moving structure according to claim 1, wherein the seat rail contact portion includes a roller configured to roll on the rail support surface portion.

9. The seat moving structure according to claim 8, wherein the roller is one of a plurality of rollers provided in the longitudinal direction of the seat.

10. The seat moving structure according to claim 9, wherein the rollers are supported in a rolling manner such that the rollers are in a row in the longitudinal direction of the seat inside a bracket which has a U shape cross section which opens downward as viewed in a front view.

11. The seat moving structure according to claim 10, wherein portions of the bracket which face the rollers in a vertical direction are cut out.

12. The seat moving structure according to claim 1, wherein the opening portion has an elongated hole shape.

13. The seat moving structure according to claim 1, wherein the opening portion is defined along the moving trajectory of the seat rail contact portion.

14. The seat moving structure according to claim 1, wherein:
    the opening portion is one of a plurality of opening portions;
    the opening portions align in two rows; and
    the two rows are respectively positioned at both sides of the moving trajectory of the seat rail contact portion in a vehicle width direction.

15. The seat moving structure according to claim 8, further comprising a roller assembly which supports the roller in a rotatable manner, wherein the roller assembly is fixed to the bottom of the seat.

16. A seat moving structure for a utility vehicle, the seat moving structure comprising:
    a seat; and
    a seat rail for guiding movement of the seat in a longitudinal direction of the seat,
    wherein:
    the seat has a seat rail contact portion which is in contact with the seat rail and fixed to a bottom of the seat;
    the seat rail has a rail support surface portion which supports the seat rail contact portion from below;
    the seat rail contact portion is made of a resin;
    the seat is movably supported in a line contact state or in a point contact state in the longitudinal direction of the seat on the rail support surface portion by the seat rail contact portion;
    the seat rail contact portion includes a plurality of rollers configured to roll on the rail support surface portion;
    the rollers are supported in a rolling manner such that the rollers are in a row in the longitudinal direction of the seat inside a bracket which has a U shape cross section which opens downward as viewed in a front view; and
    portions of the bracket which face the rollers in a vertical direction are cut out.

* * * * *